US012078298B2

(12) United States Patent
Herry et al.

(10) Patent No.: US 12,078,298 B2
(45) Date of Patent: Sep. 3, 2024

(54) SEALED AND THERMALLY INSULATING TANK PROVIDED WITH A LOADING/UNLOADING TOWER

(71) Applicant: GAZTRANSPORT ET TECHNIGAZ, Saint Remy les Chevreuse (FR)

(72) Inventors: Mickael Herry, Saint Remy les Chevreuse (FR); Pierre Charbonnier, Saint Remy les Chevreuse (FR); Mohammed Oulalite, Saint Remy les Chevreuse (FR); Emmanuel Hivert, Saint Remy les Chevreuse (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 922 days.

(21) Appl. No.: 17/049,811

(22) PCT Filed: Apr. 25, 2019

(86) PCT No.: PCT/FR2019/050981
§ 371 (c)(1),
(2) Date: Oct. 22, 2020

(87) PCT Pub. No.: WO2019/211551
PCT Pub. Date: Nov. 7, 2019

(65) Prior Publication Data

US 2021/0254788 A1 Aug. 19, 2021

(30) Foreign Application Priority Data

May 2, 2018 (FR) ........................................ 1853794

(51) Int. Cl.
*F17C 13/08* (2006.01)
*B67D 7/62* (2010.01)
(Continued)

(52) U.S. Cl.
CPC .................. *F17C 3/02* (2013.01); *B67D 7/62* (2013.01); *B67D 7/78* (2013.01); *B67D 7/84* (2013.01);
(Continued)

(58) Field of Classification Search
CPC .... F17C 3/025; F17C 6/00; F17C 9/00; F17C 13/02; F17C 2205/0103
See application file for complete search history.

(56) References Cited

U.S. PATENT DOCUMENTS

2018/0073678 A1 3/2018 Givoloup et al.

FOREIGN PATENT DOCUMENTS

AU 2011266930 B2 12/2011
EP 3286489 B1 6/2021
(Continued)

OTHER PUBLICATIONS

Antoine, Sealed and thermally insulated tank fitted with a through-element, 2015, Full Document (Year: 2015).*
(Continued)

*Primary Examiner* — Nael N Babaa
(74) *Attorney, Agent, or Firm* — Notaro, Michalos & Zaccaria P.C.

(57) ABSTRACT

A sealed and thermally insulating tank for storing a fluid, the tank being anchored in a load-bearing structure, the tank having a loading/unloading tower suspended from a ceiling wall of the load-bearing structure, the tank having a support foot that is fastened to the load-bearing structure in a zone of a bottom wall of the tank, the support foot being arranged to guide a vertical translational movement of the loading/unloading tower, the tank having at least one sump that is formed in the bottom wall of the tank, the bottom wall of the tank having a corrugated sealing membrane that is intended to be in contact with the fluid having at least first corruga-
(Continued)

tions extending in a first direction and spaced apart from one another, the sump and the support foot are spaced apart by a distance at least three first corrugations pass between the sump and the support foot.

15 Claims, 8 Drawing Sheets

(51) Int. Cl.

| | |
|---|---|
| ***B67D 7/78*** | (2010.01) |
| ***B67D 7/84*** | (2010.01) |
| ***B67D 9/02*** | (2010.01) |
| ***F17C 3/02*** | (2006.01) |
| ***F17C 6/00*** | (2006.01) |
| ***F17C 9/00*** | (2006.01) |
| ***F17C 13/02*** | (2006.01) |
| *F04B 15/08* | (2006.01) |

(52) U.S. Cl.

CPC ................ *B67D 9/02* (2013.01); *F17C 3/025* (2013.01); *F17C 6/00* (2013.01); *F17C 9/00* (2013.01); *F17C 13/02* (2013.01); *F17C 13/082* (2013.01); *F04B 2015/081* (2013.01); *F17C 2203/0631* (2013.01); *F17C 2205/0103* (2013.01); *F17C 2205/018* (2013.01); *F17C 2205/0355* (2013.01); *F17C 2221/033* (2013.01); *F17C 2227/0135* (2013.01); *F17C 2250/0417* (2013.01); *F17C 2260/011* (2013.01); *F17C 2260/016* (2013.01); *F17C 2270/0105* (2013.01); *F17C 2270/0118* (2013.01)

(56) References Cited

FOREIGN PATENT DOCUMENTS

| | | | | | |
|---|---|---|---|---|---|
| FR | 2691520 | A1 | | 11/1993 | |
| FR | 2877638 | A1 | | 5/2006 | |
| FR | 3032258 | A1 | * | 8/2016 | ............. B63B 25/14 |
| KR | 20100092748 | A | | 8/2010 | |
| KR | 20100103266 | A | | 9/2010 | |
| KR | 20130036405 | A | | 4/2013 | |
| KR | 20130081276 | A | | 7/2013 | |
| KR | 20150068806 | A | | 6/2015 | |
| KR | 20160119343 | A | | 10/2016 | |
| RU | 2431076 | C2 | | 10/2011 | |
| RU | 2526473 | C1 | | 8/2014 | |
| WO | 14057221 | A2 | | 4/2014 | |
| WO | WO-2016170254 | A1 | * | 10/2016 | ............ F17C 13/004 |
| WO | 2017174938 | A1 | | 10/2017 | |

OTHER PUBLICATIONS

Chapot, Storage and transportation installation of a cryogenic fluid embedded on a ship, 2015, Full Document (Year: 2015).*

Indian Search Report for corresponding Application No. 202027046151 dated Jun. 13, 2022.

Korean Search Report for corresponding Korean Application No. 10-2020-7034199 dated May 19, 2022.

Russian Search Report for corresponding Russian application completed May 25, 2022.

International Search Report for corresponding PCT application No. PCT/FR2019/050981, mailed Sep. 24, 2019.

* cited by examiner

SEALED AND THERMALLY INSULATING TANK PROVIDED WITH A LOADING/UNLOADING TOWER

TECHNICAL DOMAIN

The invention relates to the field of sealed and thermally insulating tanks carried on a ship and fitted with a loading/unloading tower to load the fluid into the tank and/or to unload the fluid.

TECHNOLOGICAL BACKGROUND

Sealed and thermally insulating storage tanks for liquefied natural gas (LNG) carried on a ship and fitted with a loading/unloading tower are known in the prior art, for example document KR20160119343. The loading/unloading tower is in a general way suspended from a ceiling wall of a load-bearing structure, the load-bearing structure representing the internal hull of the ship. The tank also has a support foot that is fastened to the load-bearing structure in a zone of a bottom wall of the tank. The support foot is arranged to guide a vertical translational movement of the loading/unloading tower.

A tank of this kind has, in particular, a corrugated primary sealing membrane designed to be in contact with the liquefied gas. The corrugated sealing membrane comprises a plurality of corrugations in order to increase its flexibility, in particular in the event of deformations linked to the large variations in temperature.

In order to maximize the operating efficiency of such a tank, it is desirable to optimize the useful cargo volume that can be loaded in the tank and unloaded from the tank. The use of an offloading pump sucking the liquid toward the top of the tank requires a certain liquid height to be maintained at the bottom of the tank, without which the suction member of the pump becomes connected with the gaseous phase, which drains and/or degrades the pump. For that reason, it is known to create a sump in the bottom wall of such a tank, locally interrupting the sealing membrane in order that the liquid in the sump be at the lowest level of the tank.

The pump whose suction member is located in the sump is attached to the loading/unloading tower. The support foot and the sump locally interrupt the sealing membrane and are attached thereto, thus forming a zone where the sealing membrane is attached at two close, fixed points.

When at sea, under the action of the swell, the liquefied gas storage tanks are subjected to the phenomenon of load sloshing. These phenomena can be very violent inside the tank and consequently generate significant forces in the tank and notably on the equipment, such as the loading/unloading tower and the attachment elements for the pumps. The pumps are then attached sufficiently close to the loading/unloading tower to avoid amplifying the susceptibility to sloshing phenomena.

However, and in particular in the zone located between the sump and the support foot, the sealing membrane is limited in terms of flexibility, as a result of which the fatigue life in this zone can be reduced.

SUMMARY

One idea upon which the invention is based is to ensure sufficient flexibility of the sealing membrane, in particular in special zones such as close to the support foot or to a sump, in order to avoid the membrane experiencing excessive loads, for example during thermal contraction/dilation.

According to one embodiment, the invention provides a sealed and thermally insulating tank for storing a fluid, the tank being anchored in a load-bearing structure, the tank having a loading/unloading tower suspended from a ceiling wall of the load-bearing structure, the tank having a support foot that is fastened to the load-bearing structure in a zone of a bottom wall of the tank, said support foot being arranged to guide a vertical translational movement of the loading/unloading tower, the tank having at least one sump that is formed in the bottom wall of the tank, the bottom wall of the tank comprising a corrugated sealing membrane that is intended to be in contact with the fluid, the corrugated sealing membrane comprising at least first corrugations extending in a first direction and spaced apart from one another, wherein the sump and the support foot are spaced apart by a distance such that at least three first corrugations pass between the sump and the support foot.

According to one embodiment, the sump and the support foot are spaced apart by a distance such that at least four first corrugations pass between the sump and the support foot.

In other words, the distance between the at least one sump and the support foot is at least close to thrice the corrugation pitch, that is to say slightly less than or equal to or greater than thrice the corrugation pitch, the corrugation pitch being the distance between two adjacent first corrugations outside the special zones, that is to say in a region of the tank wall where the membrane is not interrupted by an element of the tank such as the sump or the support foot. A corrugation pitch of this kind may have a value of between 250 mm and 500 mm. In the special zones, two adjacent corrugations may be spaced apart by one corrugation pitch, or by a singular corrugation pitch that differs from the corrugation pitch.

Thus, the presence of at least four corrugations lends the sealing membrane sufficient flexibility between the sump and the support foot. Indeed, the sealing membrane is attached in a leaktight manner to the sump and also attached in a leaktight manner to the support foot. Thus, the invention advantageously makes it possible to provide a sufficient number of corrugations between two attachment points of the sealing membrane.

According to one embodiment, the sealing membrane is attached in a leaktight manner, that is to say using continuous weld seams, to the sump so as to maintain the leaktight character of the bottom wall.

According to one embodiment, the sealing membrane is attached in a leaktight manner to the support foot so as to maintain the leaktight character of the bottom wall.

According to one embodiment, the sealing membrane comprises second corrugations extending in a second direction perpendicular to the first direction, the at least one sump and the support foot being positioned between the directrices of two second corrugations, and more particularly centrally between these.

According to one embodiment, the load-bearing structure is integrated into a ship, the ship having a longitudinal direction corresponding to the length of the ship and a transverse direction that is perpendicular to the longitudinal direction. Thus, the first direction may correspond to the longitudinal direction of the ship, or to the transverse direction.

According to one embodiment, the sump interrupts at least one and preferably two first corrugations and at least one and preferably two second corrugations.

According to one embodiment, in a zone of the bottom wall of the tank, remote from the support foot, the first corrugations are straight, parallel and equidistant, extending in the first direction, and the second corrugations are straight, parallel and equidistant, extending in the second direction, the distance between two adjacent first corrugations and the distance between two adjacent second corrugations being equal to the corrugation pitch.

According to one embodiment, a first corrugation adjacent to one of the first corrugations interrupted by the sump has a singular portion that is offset at a distance from the at least one sump.

According to one embodiment, the singular portion fits between the at least one sump and the support foot.

Thus, the singular portion is offset from the directrice of the corrugation in the zone of the bottom wall of the tank that is remote from the loading/unloading tower, so as to not be interrupted by the sump. In this way, the corrugation which should have been interrupted by the sump thus fits between the sump and the support foot, thus increasing the flexibility of the sealing membrane in this zone, by increasing the number of corrugations present between these elements.

According to one embodiment, the load-bearing structure is integrated into a ship, the ship having a longitudinal direction and the first corrugations are longitudinal corrugations extending in the longitudinal direction of the ship.

According to one embodiment, the first corrugations are transverse corrugations extending in a transverse direction of the ship that is perpendicular to the longitudinal direction of the ship.

According to one embodiment, the load-bearing structure is integrated into a ship, the ship having a longitudinal direction and a transverse direction that is perpendicular to the longitudinal direction, and the second corrugations are transverse corrugations extending in the transverse direction of the ship.

According to one embodiment, the second corrugations are longitudinal corrugations extending in the longitudinal direction of the ship.

According to one embodiment, the loading/unloading tower comprises a base that extends horizontally and supports at least a first pump, attached to the base, and fitted with a suction member, the suction member of the first pump being accommodated in the sump, the first pump being aligned with the support foot in a first transverse plane that is orthogonal to the first direction or to the second direction.

According to one embodiment, the loading/unloading tower comprising a first, a second and a third vertical pylons defining a triangular-section prism, each pylon having a lower end, the base being fastened to the lower end of the first, second and third pylons, the first pump being arranged outside the triangular prism and the support foot extending the triangular-section prism.

According to one embodiment, the first pylon and the second pylon are aligned in a second transverse plane which is orthogonal to the first direction.

According to one embodiment, the loading/unloading tower carries a second pump that is fastened to the base and fitted with a suction member, the second pump being arranged outside the triangular prism and being aligned with the first pump and the support foot in the first transverse plane.

According to one embodiment, the tank has a second sump that is formed in the bottom wall of the tank and that houses the suction member of the second pump.

According to one embodiment, the base has at least one first lateral flange that projects in the second direction beyond the triangular-section prism and to which the first pump is fastened.

According to one embodiment, the base has a second lateral flange that projects in the second direction beyond the triangular-section prism and to which the second pump is fastened.

Another idea at the heart of the invention is to propose a sealed and thermally insulating storage tank for a fluid that is carried on board a ship and fitted with a loading/unloading tower, that occupies limited space, and that has improved mechanical strength with regard to sloshing phenomena.

According to a first aspect, the invention provides a sealed and thermally insulating storage tank for a fluid that is anchored in a load-bearing structure that is built into a ship, the ship having a longitudinal direction, the tank having a loading/unloading tower suspended from a ceiling wall of the load-bearing structure, the loading/unloading tower including first, second and third vertical pylons defining a triangular-section prism, each pylon having a lower end, the loading/unloading tower also having a base that extends horizontally and that is fastened to the lower end of the first, second and third pylons; the loading/unloading tower carrying at least a first pump that is fastened to the base and fitted with a suction member; the tank having a support foot that is fastened to the load-bearing structure in a zone of the bottom wall of the tank that extends the triangular-section prism, said support foot being arranged to guide a vertical translational movement of the loading/unloading tower; the tank having at least one first sump that is formed in the bottom wall of the tank and that houses the suction member of the first pump, the first pump being arranged outside the triangular prism and being aligned with the support foot in a first transverse plane that is orthogonal to the longitudinal direction of the ship.

Thus, since the first pump and the support foot are aligned transversely, i.e. in the preferential direction of the sloshing phenomena, the bending or torsion stresses liable to be exerted as a result of the sloshing phenomena on the loading/unloading tower and consequently on the multi-layer structure of the ceiling wall and/or the bottom wall in the zones adjacent to said loading/unloading tower are reduced.

Furthermore, since the first pump is arranged outside the triangular-section prism defined by the three pylons, the dimensions of the pylons of the loading/unloading tower can be limited while enabling the first pump to have a suction member seated in a sump, which also helps to further limit the stresses liable to be applied to the loading/unloading tower as a result of the sloshing phenomena.

Such an arrangement of the pump and of the loading/unloading tower is therefore compact and particularly resistant to sloshing phenomena.

According to advantageous embodiments, such a tank may have one or more of the following features:

According to one embodiment, the first sump is centered or substantially centered on the axis of the first pump.

According to one embodiment, the loading/unloading tower carries a second pump that is fastened to the base and fitted with a suction member, the second pump being arranged outside the triangular prism and being aligned with the first pump and the support foot in the first transverse plane (P2).

According to one embodiment, the tank has a second sump that is formed in the bottom wall of the tank and that houses the suction member of the second pump.

According to one embodiment, the second sump is centered on the axis of the second pump.

According to one embodiment, the first sump is positioned away from the support foot by a distance equal to or greater than 1 m. According to one embodiment, the second sump is positioned away from the support foot by a distance equal to or greater than 1 m. The above features thus ensure the acceptable mechanical strength of the bottom wall of the tank while enabling the suction member of one pump and preferably of both to be accommodated in a sump.

According to one embodiment, the first and second pylons are aligned in a second transverse plane that is orthogonal to the longitudinal direction of the ship.

According to one embodiment, the third pylon extends in a longitudinal plane that is equidistant from the first and second pylons.

According to one embodiment, the diameter of the third pylon is greater than the diameter of the first and second pylons.

According to one embodiment, the third pylon forms an emergency well enabling an emergency pump and an unloading line to be lowered.

According to one embodiment, the loading/unloading tower carries a third pump that is fastened to the base, the third pump being aligned with said first and second pylons in the second transverse plane and arranged between said first and second pylons. This helps to protect the third pump against sloshing phenomena.

According to one embodiment, the suction member of the third pump is not immersed in a sump. This helps to limit the space occupied and notably makes it possible to position the loading/unloading tower closer to a rear wall of the tank than if a sump is required between the loading/unloading tower and said rear wall.

According to one embodiment, the first pump is linked to a first unloading line that extends vertically along the loading/unloading tower, the first unloading line being aligned with said first and second pylons in the second transverse plane and arranged between the first and second pylons. This helps to protect the first unloading line against sloshing phenomena.

According to one embodiment, the second pump is linked to a second unloading line that extends vertically along the loading/unloading tower, the second unloading line being aligned with said first and second pylons in the second transverse plane (P1) and arranged between the first and second pylons.

According to one embodiment, the third pump is linked to a third unloading line that extends vertically along the loading/unloading tower, the third unloading line being aligned with said first and second pylons in the second transverse plane and arranged between the first and second pylons.

According to one embodiment, each of the pumps is linked to one of the unloading lines by means of a connection device fitted with an expansion joint.

According to one embodiment, the base has at least one first lateral flange that projects in the transverse direction beyond the triangular-section prism and to which the first pump is fastened. Thus, fastening the first pump to the loading/unloading tower does not increase or only barely increases the susceptibility of the loading/unloading tower to sloshing phenomena.

According to one embodiment, the base has a second lateral flange that projects in the transverse direction beyond the triangular-section prism and to which the second pump is fastened.

According to one embodiment, the base has a central stiffening structure, said central stiffening structure having two stiffening members that are inclined in relation to the longitudinal direction of the ship, one of the stiffening members extending in a straight line between the third pylon and the first pylon, and preferably from the third pylon to the first pylon, and the other stiffening member extending in a straight line between the second pylon and the third pylon, preferably from the second pylon to the third pylon. Stiffening members having this structure are particularly efficient in distributing forces over the entire structure.

According to one embodiment, the central stiffening structure is arranged between the first and second lateral flanges.

According to one embodiment, the central stiffening structure also has a plurality of stiffening members that extend transversely to the longitudinal direction of the ship between the two stiffening members inclined in relation to the longitudinal direction of the ship.

According to one embodiment, the first lateral flange has a half-box housing the first pump, the half-box having a horizontal bottom on which fastening lugs for said first pump are fastened, the bottom having a cutout through which said first pump can pass.

According to one embodiment, the second lateral flange has a half-box housing the second pump, the half-box having a horizontal bottom on which fastening lugs for said second pump are fastened, the bottom having a cutout through which said second pump can pass.

According to one embodiment, each half-box also has two transversely oriented vertical walls and one longitudinally oriented vertical wall, the horizontal bottom being linked to the transversely oriented vertical walls and to the longitudinally oriented vertical wall.

According to one embodiment, the first lateral flange and/or the second lateral flange have stiffening members that extend transversely to the longitudinal direction of the ship.

According to one embodiment, the first, second and third pylons are fastened to one another by cross members.

According to one embodiment, the loading/unloading tower is fitted with a radar device to measure the level of liquefied gas in the tank, the radar device including an emitter and a waveguide that extends over substantially the entire height of the tank, the waveguide being fastened using support members to the cross members that link the third pylon to the first pylon or the second pylon, the support members extending in a third transverse plane that is orthogonal to the longitudinal direction of the ship. Thus, the support members extend in the preferential direction of the sloshing phenomena such as to work primarily in traction/compression and not in flexion under the effect of the sloshing phenomena, which helps to improve the mechanical strength thereof.

According to one embodiment, the first pump and/or the second pump are arranged wholly outside the triangular-section prism.

According to one embodiment, the support foot, the first sump and optionally the second sump are placed between the directrices of two transverse corrugations, and more specifically centered therebetween.

According to a second aspect, the invention also provides a sealed and thermally insulating storage tank for a fluid that is anchored in a load-bearing structure that is built into a ship, the ship having a longitudinal direction, the tank having a loading/unloading tower suspended from a ceiling wall of the load-bearing structure, the loading/unloading tower including first, second and third vertical pylons, each pylon having a lower end, the loading/unloading tower also having a base that extends horizontally and that is fastened to the lower end of the first, second and third pylons; the loading/unloading tower also carrying at least a first pump that is fastened to the base and fitted with a suction member; the base having a central stiffening structure, said central stiffening structure having two stiffening members that are inclined in relation to the longitudinal direction of the ship, one of the stiffening members extending in a straight line from the third pylon to the first pylon, and the other stiffening member extending in a straight line from the second pylon to the third pylon.

A central stiffening structure including such stiffening members is particularly efficient in distributing forces over the entire structure.

According to advantageous embodiments, such a tank may have one or more of the following features:

According to one embodiment, the first, second and third vertical pylons define a triangular-section prism.

According to one embodiment, the tank has a support foot that is fastened to the load-bearing structure in a zone of the bottom wall of the tank that extends the triangular-section prism, said support foot being arranged to guide a vertical translational movement of the loading/unloading tower.

According to one embodiment, the first pump is arranged outside the triangular prism.

According to one embodiment, the loading/unloading tower has a second pump arranged outside the triangular prism.

According to one embodiment, the first pump and the second pump are aligned in a first transverse plane (P2) that is orthogonal to the longitudinal direction of the ship.

According to one embodiment, the base has at least one first lateral flange that projects in the transverse direction beyond the triangular-section prism and to which a first pump is fastened.

According to one embodiment, the base has a second lateral flange that projects in the transverse direction beyond the triangular-section prism and to which the second pump is fastened.

According to one embodiment, the central stiffening structure is arranged between the first and second lateral flanges.

According to one embodiment, the central stiffening structure also has a plurality of stiffening members that extend transversely to the longitudinal direction of the ship between the two stiffening members inclined in relation to the longitudinal direction of the ship.

According to one embodiment, the first lateral flange has a half-box housing the first pump, the half-box having a horizontal bottom on which fastening lugs for said first pump are fastened, the bottom having a cutout through which said first pump can pass.

According to one embodiment, the second lateral flange has a half-box housing the second pump, the half-box having a horizontal bottom on which fastening lugs for said second pump are fastened, the bottom having a cutout through which said second pump can pass.

According to one embodiment, each half-box also has two transversely oriented vertical walls and one longitudinally oriented vertical wall, the horizontal bottom being linked to the transversely oriented vertical walls and to the longitudinally oriented vertical wall.

According to one embodiment, the first lateral flange and/or the second lateral flange have stiffening members that extend transversely to the longitudinal direction of the ship.

According to one embodiment, the first and second pylons are aligned in a second transverse plane that is orthogonal to the longitudinal direction of the ship.

According to one embodiment, the third pylon extends in a longitudinal plane that is equidistant from the first and second pylons.

According to one embodiment, the invention also provides a ship including a load-bearing structure and one of the aforementioned tanks anchored in said load-bearing structure.

According to one embodiment, the invention also provides a method for loading onto or unloading from such a ship, in which a fluid is channeled through insulated pipes to or from an onshore or floating storage facility to or from the tank on the ship.

According to one embodiment, the invention also provides a transfer system for a fluid, the system including the aforementioned ship, insulated pipes arranged to connect the tank installed in the hull of the ship to an onshore or floating storage facility and a pump for driving a fluid through the insulated pipes to or from the onshore or floating storage facility to or from the tank on the ship.

SHORT DESCRIPTION OF THE FIGURES

The invention can be better understood, and additional objectives, details, features and advantages thereof are set out more clearly, in the detailed description below of several specific embodiments of the invention given solely as non-limiting examples, with reference to the drawings attached.

DETAILED DESCRIPTION OF THE EMBODIMENTS

By convention, an orthonormal frame defined in the figures by the two axes x and y is used to describe the elements of the tank. The axis x represents a longitudinal direction of the ship and the axis y represents a transverse axis perpendicular to the longitudinal direction of the ship.

Figure 1:
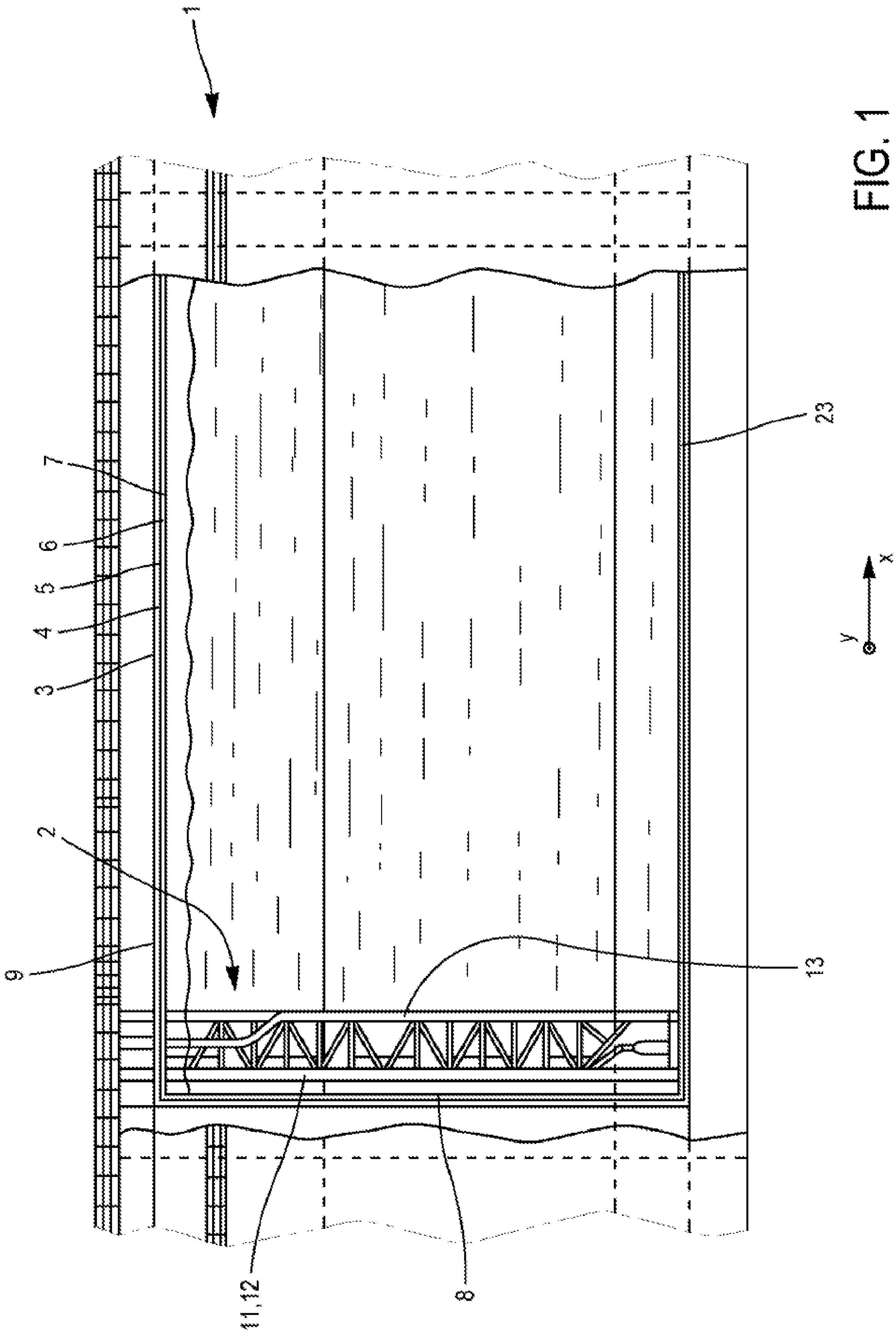
FIG. 1 is a schematic cutaway view of a sealed and thermally insulating storage tank for a fluid fitted with a loading/unloading tower.

FIG. 1 shows a sealed and thermally insulating tank 1 for storing liquefied gas that is fitted with a loading/unloading tower 2 used notably to load the liquefied gas into the tank 1 and/or to unload the liquefied gas. The liquefied gas can notably be liquefied natural gas (LNG), i.e. a gaseous mixture comprising primarily methane and one or more other hydrocarbons, such as ethane, propane, n-butane, i-butane, n-pentane, i-pentane, neopentane, and nitrogen in small quantities.

The tank 1 is anchored in a load-bearing structure 3 built into a ship. The load-bearing structure 3 is for example formed by the double hull of a ship, but can also more generally be formed by any type of rigid partition having appropriate mechanical properties. The tank 1 can be used to transport liquefied gas or to receive liquefied gas used as fuel to power the ship.

According to one embodiment, the tank 1 is a membrane tank. In such a tank 1, each wall comprises, successively from outside to inside in the thickness direction of the wall, a secondary thermally insulating barrier 4 comprising insulating elements bearing against the load-bearing structure 3, a secondary sealing membrane 5 anchored to the insulating elements of the secondary thermally insulating barrier 4, a primary thermally insulating barrier 6 comprising the insulating elements bearing against the secondary sealing membrane 5 and a primary sealing membrane 7 anchored to the insulating elements of the primary thermally insulating barrier 5 and designed to be in contact with the fluid contained in the tank 1.

By way of example, each wall can notably be a Mark III wall as described for example in FR2691520, an NO96 wall as described for example in FR2877638, or a Mark V wall as described for example in WO14057221.

The loading/unloading tower 2 is installed in the vicinity of the rear wall 8 of the tank 1, which helps to optimize the quantity of cargo that can be unloaded by the loading/unloading tower 2, since ships are usually tilted backwards through the specific use of ballast, notably in order to limit vibrations.

The loading/unloading tower 2 is suspended from an upper wall 9 of the load-bearing structure 3. According to a preferred embodiment, the upper wall 9 of the load-bearing structure 3, in the vicinity of the rear wall 8, has a rectangular parallelepipedic space (not shown) that projects upwards, referred to as the liquid dome. The liquid dome is formed by two transverse walls (front and rear) and by two side walls that extend vertically and project upwards from the upper wall 9. The liquid dome also has a horizontal cover 10, shown in FIGS. 2 and 3, from which the loading/unloading tower 2 is suspended.

The loading/unloading tower 2 extends over substantially the entire height of the tank 1. The loading/unloading tower 2 has a tripod structure, i.e. a structure comprising three vertical pylons 11, 12, 13 that are fastened to one another by cross members 14. Each of the pylons 11, 12, 13 is hollow and passes through the cover 10 of the liquid dome.

The three pylons 11, 12, 13 define a triangular-section prism with the cross members 14. According to one embodiment, the three pylons 11, 12, 13 are equidistant from one another such that the section of the prism is an equilateral triangle. Advantageously, the three pylons 11, 12, 13 are arranged such that at least one of the faces of the prism lies in a transverse plane P1 that is orthogonal to the longitudinal direction x of the ship. In other words, two of the pylons 11, 12 are aligned in the transverse plane P1. More specifically, the two pylons 11, 12 that are aligned in the transverse plane P1 are the two rear pylons, i.e. the pylons closest to the rear wall 8 of the tank 1.

Figure 2:
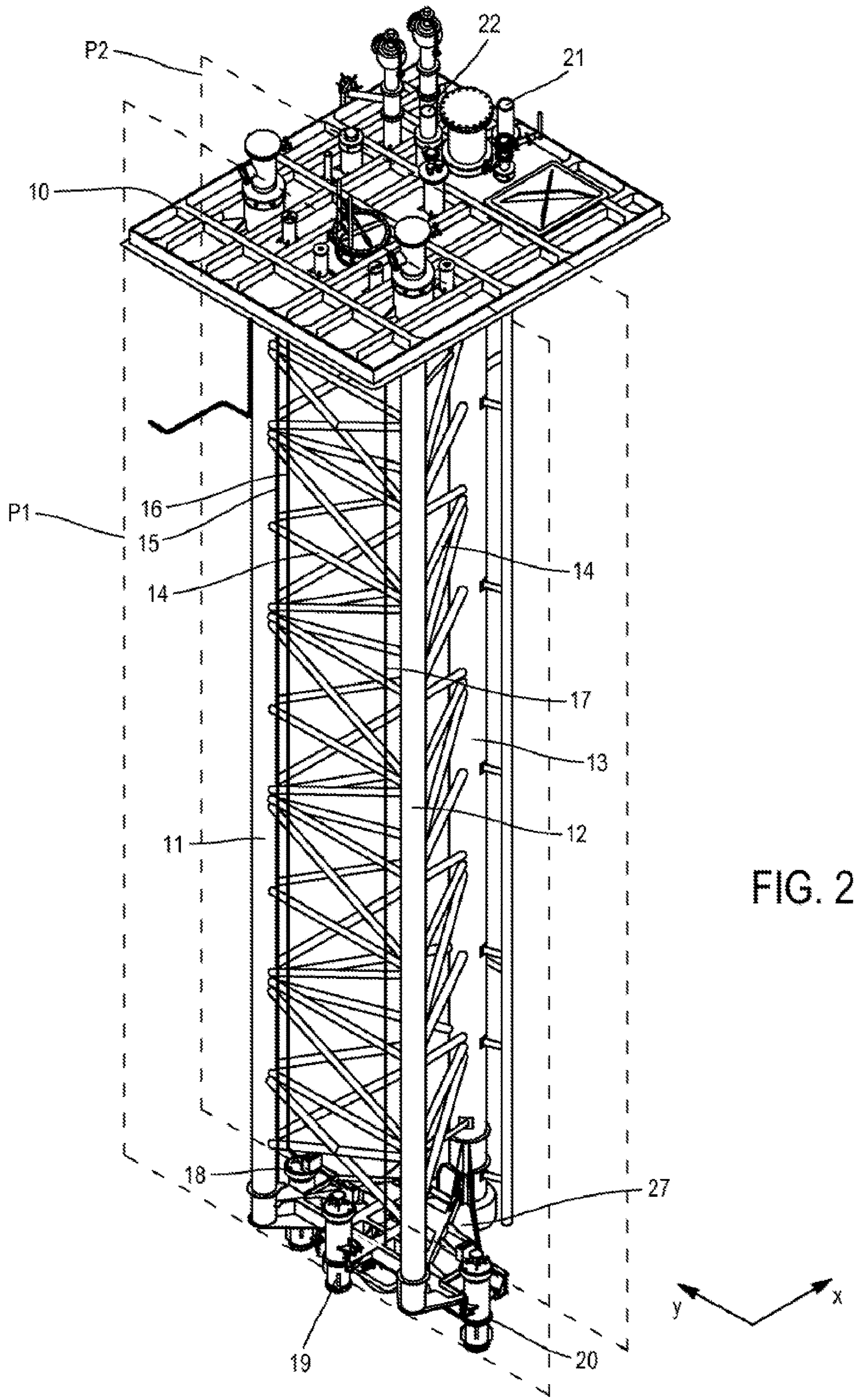
FIG. 2 is a perspective view of a loading/unloading tower.
Figure 3:
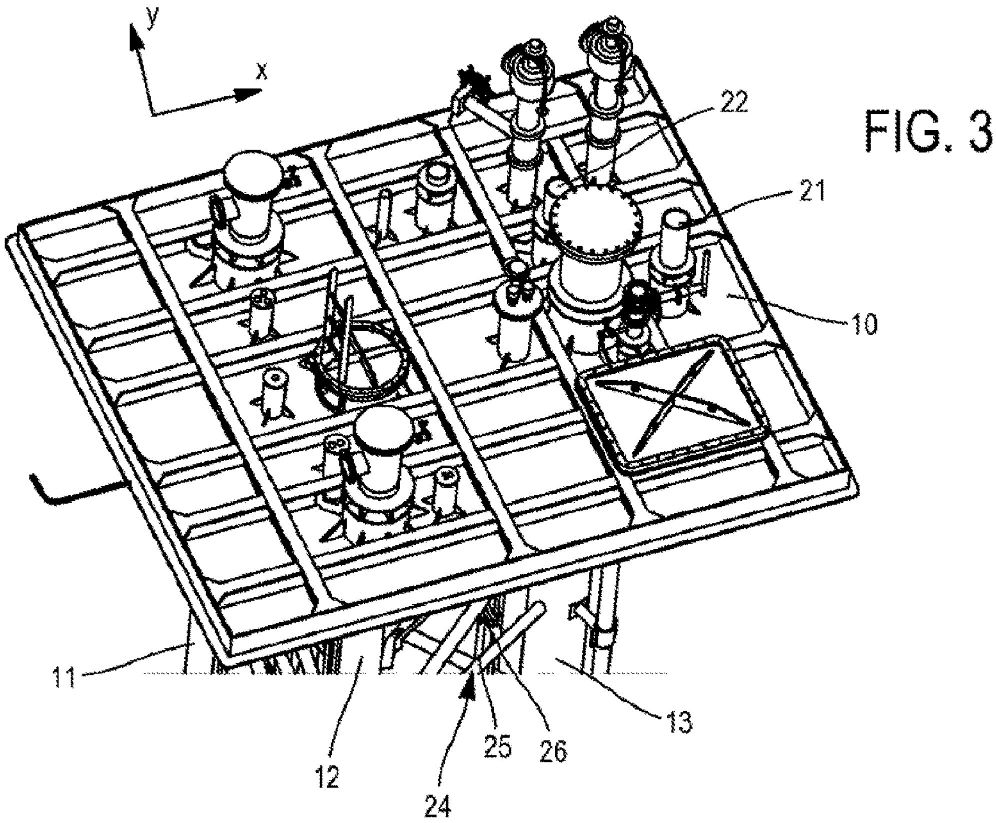
FIG. 3 is a detailed perspective view of the top portion of the loading/unloading tower in FIG. 2.
Figure 4:
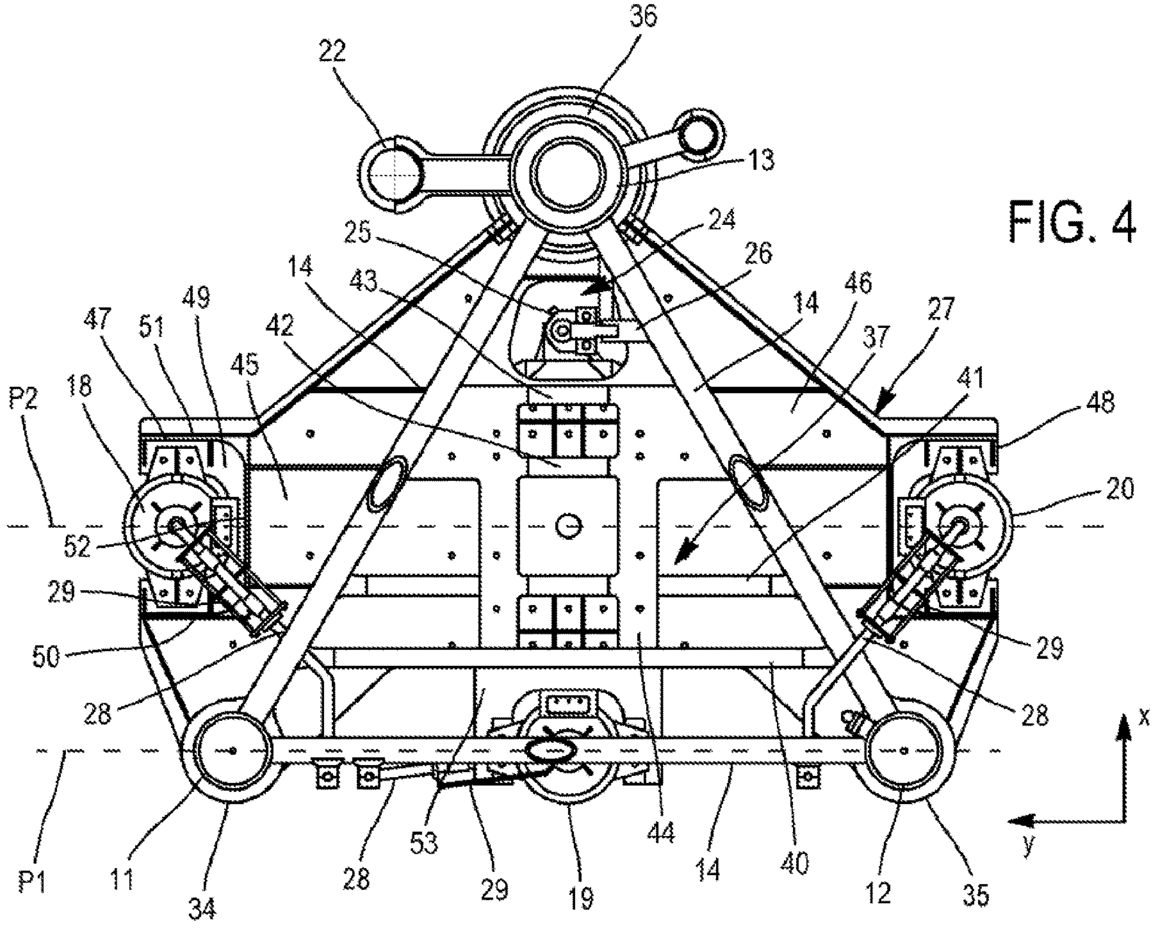
FIG. 4 is a top view of the bottom portion of the loading/unloading tower in FIG. 2.

As shown in FIGS. 2 to 4, the diameter of the front pylon 13 is greater than the diameter of the two rear pylons 11, 12. The front pylon 13 forms an emergency well enabling an emergency pump and an unloading line to be lowered in the event of failure of the other unloading pumps.

Furthermore, in the embodiment shown, the two pylons 11, 12 form sleeves for electrical power supply cables, used notably to power the unloading pumps carried by the loading/unloading tower 2. Furthermore, the installation includes three unloading ducts 15, 16, 17, shown in FIG. 2, which are each attached to an unloading pump 18, 19, 20. The three unloading ducts 15, 16, 17 are arranged in the transverse plane P1. The three unloading ducts 15, 16, 17 are more specifically placed between the two pylons 11, 12. Thus, since the preferential direction of the sloshing phenomena is oriented transversely to the longitudinal direction x of the ship, such an arrangement of the unloading ducts 15, 16, 17 between the two pylons 11, 12 helps to provide protection from the sloshing phenomena.

According to an alternative embodiment (not shown), the two pylons 11, 12 are each connected to an unloading pump and form an unloading line. The loading/unloading tower 2 is then fitted with sleeves for electrical power supply cables that are arranged in the transverse plane P1 and placed between the two pylons 11, 12.

Furthermore, in the embodiment shown, the loading/unloading tower 2 is also fitted with two loading lines 21, 22 that are fastened to the front pylon. One of the two loading lines 21, shown only in FIG. 2, extends only in the upper portion of the tank 1, while the other loading line 22 extends over substantially the entire height of the tank 1 to near the bottom wall 23 of the tank 1. Advantageously, the loading line 22 that extends over substantially the entire height of the tank 1 is aligned with the pylon 13 in a transverse plane that is orthogonal to the longitudinal direction x of the ship. This helps to limit the stresses caused by the sloshing phenomena exerted on this loading line 22.

Furthermore, the loading/unloading tower 2 is fitted with a radar device 24, shown in FIGS. 3 and 4, that is used to measure the level of liquefied gas in the tank 1. The radar device 24 includes an emitter (not shown) and a waveguide 25 that is carried on the loading/unloading tower 2. The waveguide 25 extends over substantially the entire height of the tank 1. The waveguide 25 is fastened to cross members 14 linking the front pylon 13 to one of the rear pylons 11, 12 by means of support members 26 that are spaced apart regularly along the waveguide 25. The support members 26, one of which is shown in FIGS. 3 and 4, lie in a transverse plane that is orthogonal to the longitudinal direction x of the ship, which helps to improve the mechanical strength thereof.

Figure 5:
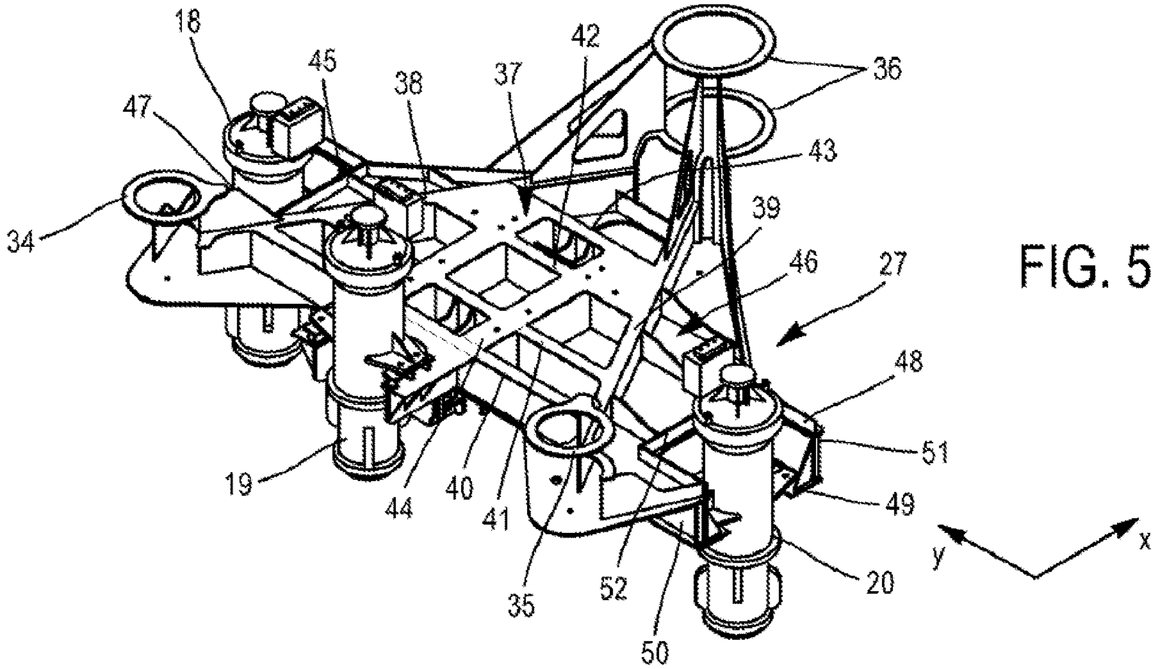
FIG. 5 is a perspective view of the base of the loading/unloading tower carrying three pumps.
Figure 6:
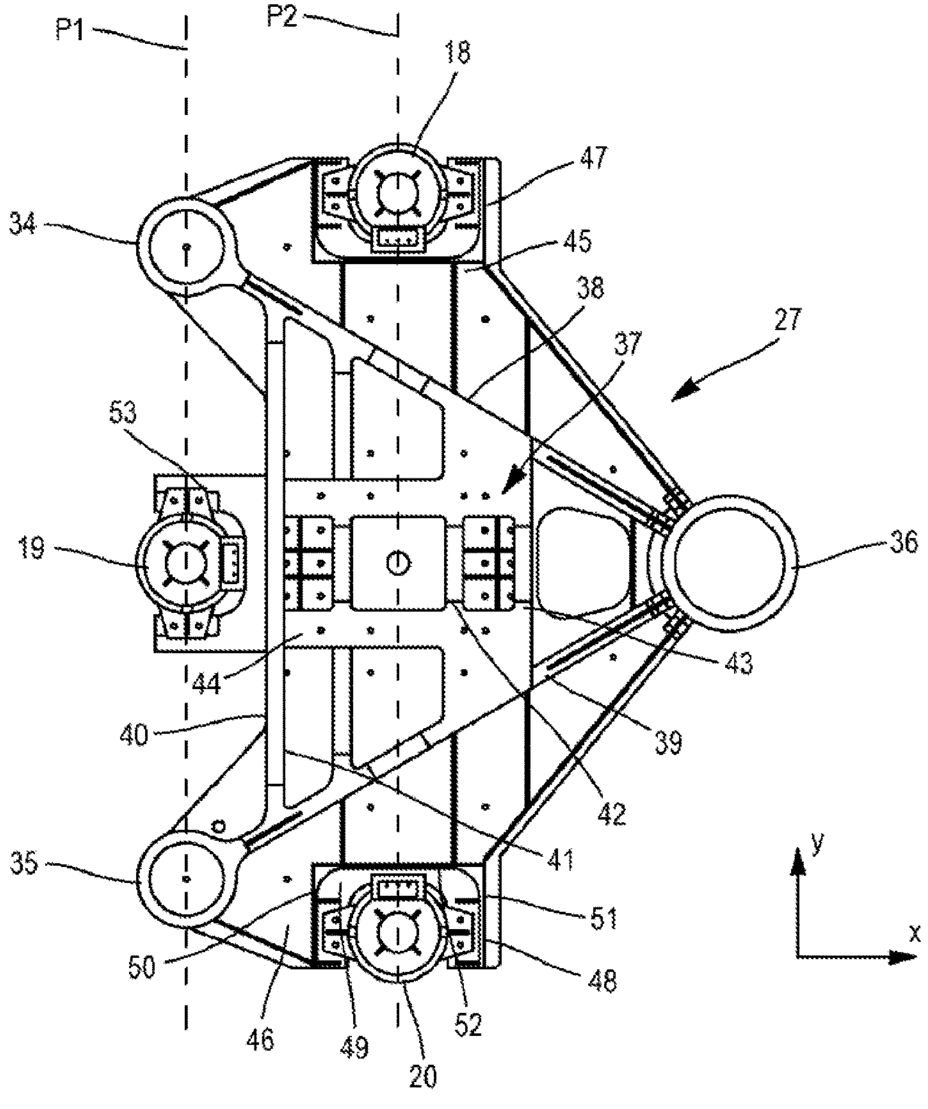
FIG. 6 is a top view of the base of the loading/unloading tower carrying three pumps.

The loading/unloading tower 2 is also fitted with a base 27, notably shown in FIGS. 4 to 6, that is fastened to the lower end of the three pylons 11, 12, 13 and that carries three unloading pumps 18, 19, 20, specifically a central pump 19 and two side pumps 18, 20. The presence of three unloading pumps 18, 19, 20 provides redundancy, which notably helps to reduce the risk of outages that require the intervention of a maintenance operative in the tank 1. The maximum flow rate of the three unloading pumps is less than 40 $m^3/h$, and is advantageously between 10 $m^3/h$ and 20 $m^3/h$, which helps to limit the space occupied by said pumps, and consequently the susceptibility thereof to sloshing phenomena.

Each of the unloading pumps 18, 19, 20 is connected to one of the unloading lines 15, 16, 17 described above. As shown in FIG. 4, each of the unloading pumps 18, 19, 20 is connected to one of the unloading lines 15, 16, 17 using connection devices 28 provided with an expansion joint 29 that is used to absorb deformations, notably while the tank 1 and/or the unloading lines are being cooled.

The central pump 19 is arranged, in the transverse plane P1, between the pylons 11, 12, which helps to protect said pump from sloshing phenomena. The two side pumps 18, 20 are aligned with one another in a transverse plane P2 that is orthogonal to the longitudinal direction x of the ship.

The side pumps 18, 20 are arranged outside the triangular prism formed by the three pylons 11, 12, 13. This leaves enough distance between the side pumps 18, 20 to enable the suction member thereof to be seated in the sumps 30 (described below) without thereby further increasing the dimensions of the loading/unloading tower 2. Indeed, to ensure acceptable mechanical strength of the walls of the tank 1, there must be a minimum distance between the equipment interrupting the multi-layer structure of the walls, such as the sumps 30 or the support foot 31 of the loading/unloading tower 2. Consequently, with a support foot 31 (described below) positioned in the zone of the bottom wall 23 opposite the central axis of the loading/unloading tower 2, the sumps 30 designed to house the suction member of the side pumps 18, 20 must be far enough away from the central axis of the loading/unloading tower 2 to ensure that the mechanical performance of the bottom wall 23 of the tank 1 is not adversely affected.

Figure 7:
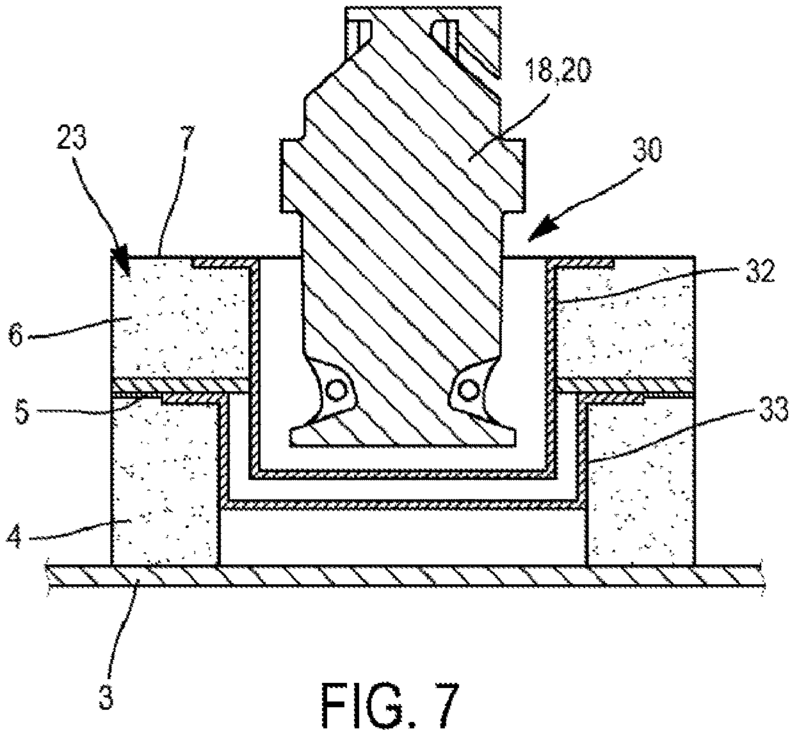
FIG. 7 is a schematic cross-section view of a sump.

According to one embodiment, the distance in the transverse direction y between the two side pumps 18, 20 is greater than 2 m, for example in the region of 4 m to 5 m. Furthermore, to ensure the adequate mechanical strength of the bottom wall 23, the minimum distance between a sump 30 and the support foot 31 is greater than 1 m. Advantageously, if the primary sealing membrane 7 is a corrugated membrane, the distance between a sump 30 and the support foot 31 is greater than thrice the corrugation pitch, extending in the longitudinal direction of the ship. The sumps 30 are designed to keep the suction members of the side pumps 18, 20 immersed in a certain quantity of liquefied gas, regardless of any sloshing phenomena in said liquefied gas, to ensure said side pumps 18, 20 remain primed and/or are not damaged. A sump 30 according to an example embodiment is shown in FIG. 7. The sump 30 receives the suction member of one of the side pumps 18, 20. The sump 30 comprises a primary cylindrical bowl 32 that provides a first container in communication with the inside of the tank 1 and a secondary cylindrical bowl 33 that provides a second container surrounding the bottom portion of the primary cylindrical bowl 32. The primary cylindrical bowl 32 is connected continuously to the primary membrane 7, sealingly completing said membrane. Similarly, the secondary cylindrical bowl 33 is connected continuously to the secondary membrane 5, sealingly completing said membrane. The sump 30 is centered on the axis of the pump 18, 20 accommodated therein.

According to an embodiment that is not shown, in order to increase the capacity of the sump 30, the load-bearing structure 3 of the bottom wall 23 has a circular opening through which the sump 30 is engaged and that enables the sump to project outside the plane of the load-bearing structure 3 of the bottom wall 23. In this case, a hollow cylindrical bowl is fastened to the load-bearing structure 3 about the opening and projects towards the outside of the load-bearing structure 3 in order to form an extension structure that provides an additional space to house the sump 30.

In the embodiment shown, only the side pumps 18, 20 are immersed in the sumps 30. Thus, when the level of liquefied gas in the tank drops beneath a threshold, the central pump 19 cannot be used and these side pumps 18, 20 are used exclusively to unload the liquefied gas. Such an arrangement is notably advantageous in that it enables the central pump 19 to be positioned between the two pylons 11, 12 and in that it enables the loading/unloading tower 2 to be positioned closer to the rear wall 8 than if a sump 30 is required between the loading/unloading tower and the rear wall 8 of the tank 1.

The structure of the base 27 is described below with reference to FIGS. 4 to 6. The base 27 has rings 34, 35, 36 through which the lower ends of the three pylons 11, 12, 13 pass. The rings 34, 35, 36 are welded to the pylons 11, 12, 13 to fasten said base 27 to the lower end of the three pylons 11, 12, 13.

Furthermore, the base 27 has a central stiffening structure 27 used to increase the stiffness of the base 27, thereby increasing the resistance of the loading/unloading tower 2 to sloshing phenomena. The central stiffening structure 37 has two stiffening members 38, 39 that are inclined in relation to the longitudinal direction x of the ship, each extending in a straight line between the central axis of one of the pylons 11, 12 and the central axis of the pylon 13. Such an arrangement providing significant stiffness is notably enabled by the positioning of the side pumps 18, 20 outside the triangular-section prism defined by the three pylons 11, 12, 13.

Furthermore, the central stiffening structure 37 has several stiffening members 40, 41, 42, 43 that extend transversely and join the two inclined stiffening members 39, 39. The central stiffening structure 37 also has stiffening members 44 that extend in the longitudinal direction between the transversely extending stiffening members 40, 41, 42, 43. In the embodiment illustrated, the base 27 is a flat sheet and the stiffening members 38, 39, 40, 41, 42, 43, 44 are metal beams that are welded to the flat sheet.

The base 27 also has two lateral flanges 45, 46 that project in the transverse direction y beyond the triangular-section prism defined by the three pylons 11, 12, 13. The lateral flanges 45, 46 fasten the side pumps 18, 20 to the base 27 outside the triangular prism formed by the three pylons 11, 12, 13.

As shown in FIG. 5, the side pumps 18, 20 are more specifically accommodated in half-boxes 47, 48 opening towards the outside of the loading/unloading tower 2. The half-boxes 47, 48 project beyond the rest of the base 27 towards the bottom wall 23 of the tank 1, which enables the side pumps 18, 20 to be lowered enough for the related suction member to be seated in a sump 30. Each half-box 47, 48 is formed by a horizontal bottom 49 that is linked to two transversely oriented vertical walls 50, 51 and a longitudinally oriented vertical wall 52. The bottom 49 has a cutout through which the body of one of the side pumps 18, 20 is positioned. Each of the side pumps 18, 20 is fitted with fastening lugs to fasten said pumps to the bottom 49 about the cutout.

The lateral flanges 45, 46 are also provided with stiffening members, for example formed by vertical plates, that extend in the transverse direction and stiffening members, for example formed by vertical plates, that extend from the half-boxes 47, 48 towards one of the pylons 11, 12, 13.

The base 27 also includes a central flange 53 that is positioned between the two pylons 11, 12. The central flange 53 has a cutout through which the body of the central pump 19 is positioned. The central pump 19 has fastening lugs to fasten said pump to the central flange 53 about the cutout.

Figure 9:
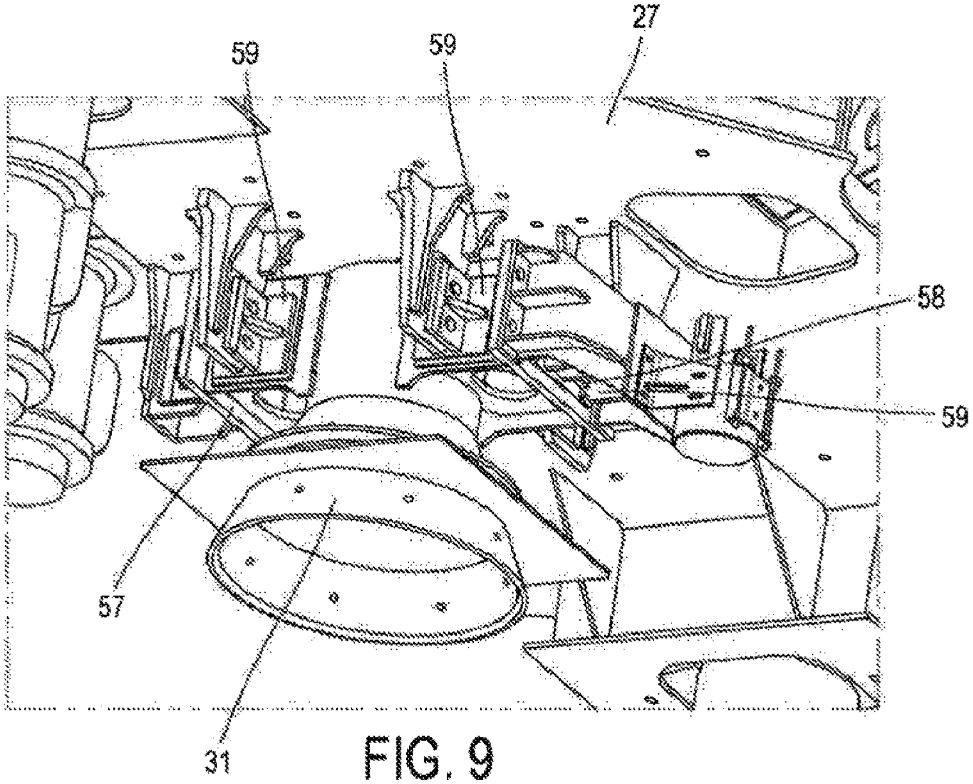
FIG. 9 is a detailed bottom view of the unloading tower showing the guidance of the loading/unloading tower on the support foot.

FIG. 9 shows that the loading/unloading tower 2 has a guide device that is fastened against the bottom face of the base 27 and that cooperates with a support foot 31 that is fastened to the bottom wall of the load-bearing structure 3.

Such a guide device is intended to enable the relative movements of the loading/unloading tower 2 in relation to the support foot 31 in the vertical direction of the tank 1 in order to enable the loading/unloading tower 2 to contract or to expand as a function of the temperatures to which said tower is subjected, while preventing any horizontal movements of the base 27 of the loading/unloading tower 2.

Figure 8:
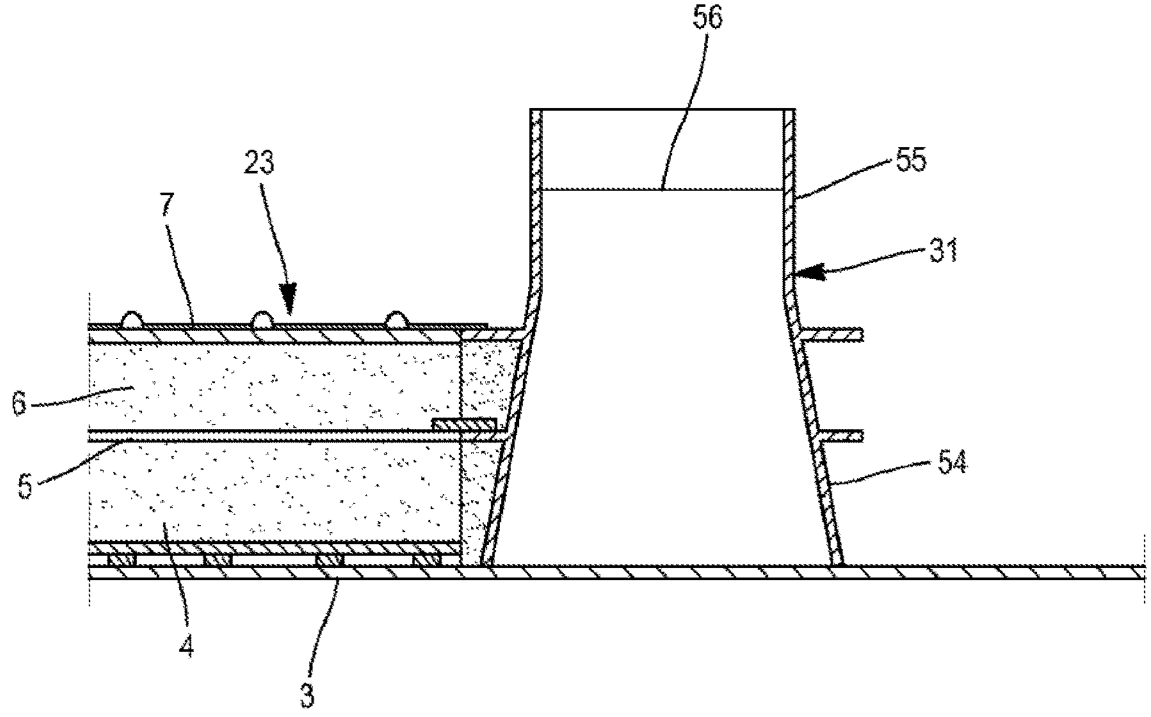
FIG. 8 is a schematic cross-section view of a support foot designed to guide a vertical translational movement of the loading/unloading tower.

As shown schematically in FIG. 8, the support foot 31 has a rotational shape of circular section with a tapered bottom portion 54 that is connected at the end of lesser diameter thereof to the cylindrical top portion 55. The base of greater diameter of the tapered portion bears against the bottom wall of the load-bearing structure 3. The tapered bottom portion 54 extends through the thickness of the bottom wall 23 of the tank 1 beyond the level of the primary sealing membrane 7. The cylindrical top portion 55 is closed sealingly by a circular plate 56. The primary sealing membrane 7 and the secondary sealing membrane 5 are connected sealingly to the tapered bottom portion 54.

Furthermore, as shown in FIG. 9, two guide elements 57, 58 are welded to the support foot 6 and extend respectively towards the rear and towards the front of the tank 1. Each of the two guide elements 57, 58 has two longitudinal faces and a transverse face, each of the longitudinal and transverse faces being in contact with a guide element 59 that is fastened to the base 27 of the loading/unloading tower 2.

Figure 10:
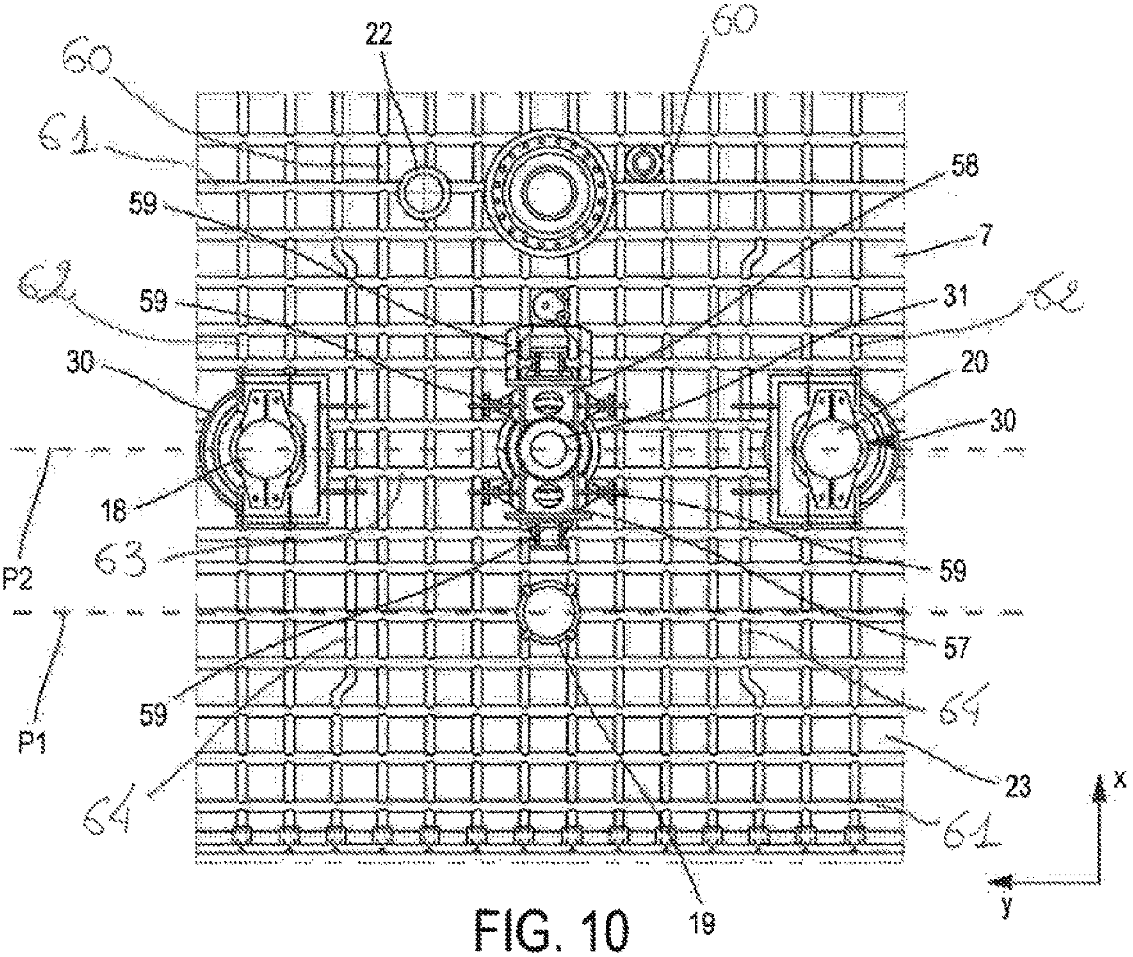
FIG. 10 is a top view of the bottom wall level with the loading/unloading tower according to a first embodiment.

FIG. 10 shows that the support foot 31 is aligned with the side pumps 18, 20 in the plane P2 and is more specifically centered between the two side pumps 18, 20. Such an arrangement is advantageous in that it helps to limit the forces caused by the sloshing phenomena acting on the side pumps 18, 20 and on the support foot 31.

Furthermore, if the primary sealing membrane 7 is a corrugated membrane, as shown in FIG. 10, in which the corrugations extend in the longitudinal and transverse directions of the ship, such an arrangement helps to limit the number of corrugations that are interrupted, thereby limiting the loss of elasticity in the primary sealing membrane 7 caused by such interruptions. Furthermore, in the embodiment shown, the sumps 30 and the support foot 31 are placed between the directrices of two transverse corrugations, and more specifically centered therebetween. This enables the corrugations to be interrupted over the shortest possible distance, given that these interruptions are liable to locally reduce the flexibility of the primary sealing membrane 7, thereby increasing the possibility of local fatigue and wear.

Thus, and as shown in FIG. 10, the primary sealing membrane 7 comprises longitudinal corrugations 60 extending in the longitudinal direction x of the ship, and transverse corrugations 61 extending in the transverse direction y of the ship. In a so-called non-special zone of the bottom wall 23, that is to say a zone remote from any obstacle such as a wall edge or a support foot 31 or a sump 30, for example, the longitudinal corrugations 60 are straight, parallel and equidistant in the longitudinal direction, and the transverse corrugations 61 are straight, parallel and equidistant in the transverse direction. The distance between two adjacent longitudinal corrugations 60 or between two adjacent transverse corrugations 61 is termed the corrugation pitch.

The corrugations 60, 61 make the primary sealing membrane 7 flexible, allowing it to deform depending, for example, on the thermal loads applied to the membrane 7. The primary sealing membrane 7 is welded in a leaktight manner, that is to say using continuous weld seams, to the sumps 30 and to the support foot 31 in order to retain the leaktight character of the bottom wall 23. It would therefore appear advantageous to provide, in this zone between two fixed points of the bottom wall 23, an increased flexibility of the primary sealing membrane 7, in order to increase the fatigue life of the primary sealing membrane 7.

Moreover, the pumps 18, 20 whose suction members are in the sumps 30 are fastened to the loading/unloading tower 2 by means of lateral flanges 45, 46. The further the pumps 18, 20 are from the support foot 31, the greater the size of the lateral flanges 45, 45, thus increasing the susceptibility of said lateral flanges to sloshing phenomena. One advantage has therefore been to find a compromise between flexibility of the sealing membrane 7 and distance of positioning of the pumps 18, 20 with respect to the support foot 31.

To that end, in the first embodiment shown in FIG. 10, the sumps 30 are spaced apart from the support foot 31 by a distance such that four longitudinal corrugations 60 pass between the sump 30 and the support foot 31, which corresponds to a distance greater than or equal to thrice the corrugation pitch.

The sumps 30 and the support foot 31 form, by virtue of their arrangement on the bottom wall 23, interrupted longitudinal corrugations 62 and interrupted transverse corrugations 63. Indeed, two longitudinal corrugations are interrupted by each sump 30 and by the support foot 31, while two transverse corrugations are interrupted multiple times by the sumps 30 and the support foot 31 in light of their alignment in the transverse direction y.

In order to minimize the distance between the pumps 18, 20 and the loading/unloading tower 2 while increasing the number of corrugations between the support foot 31 and the sumps 30, it is provided to divert longitudinal corrugations 60 adjacent to interrupted longitudinal corrugations 62 over a singular portion 64 in such a way that the singular portion 64 of the longitudinal corrugations 60 is offset at a distance from the sump 30 interrupting the adjacent interrupted longitudinal corrugation 62. Thus, the singular portions 64 pass between the sumps 30 and the support foot 31.

Figure 11:
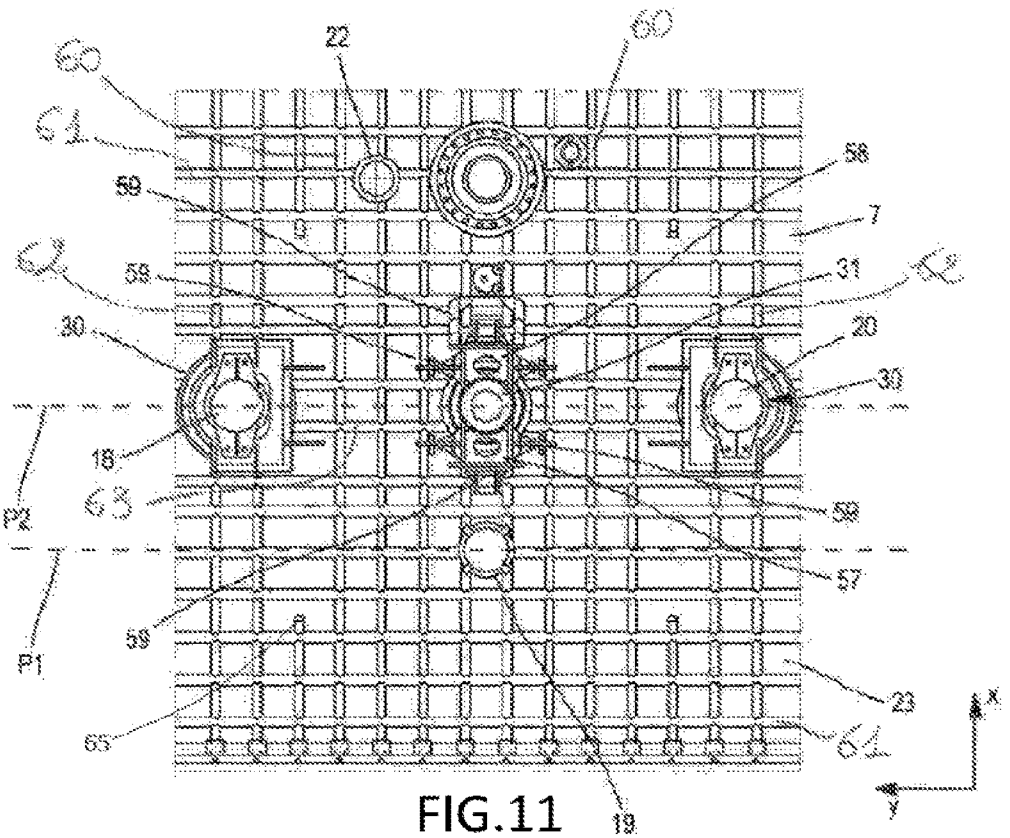
FIG. 11 is a top view of the bottom wall level with the loading/unloading tower according to a second embodiment.

FIG. 11 shows a second embodiment of the tank bottom wall, and in particular of the primary sealing membrane 7. This second embodiment is similar to the first embodiment, shown in FIG. 10, and differs from the first embodiment in the number of longitudinal corrugations 60 passing between the sump 30 and the support foot 31. In this embodiment, three longitudinal corrugations 60 pass between the sump 30 and the support foot 31, the sump 30 and the support foot 31 being spaced apart from one another by a distance greater than twice the corrugation pitch, for example close to thrice the corrugation pitch. The longitudinal corrugations 60 adjacent to interrupted longitudinal corrugations 62 are in this case not diverted. Indeed, and as shown in FIG. 11, the longitudinal corrugations 60 adjacent to interrupted longitudinal corrugations 62 are interrupted at a distance from the sumps 30 in the longitudinal direction and are closed at their end by a cap 65.

Figure 12:
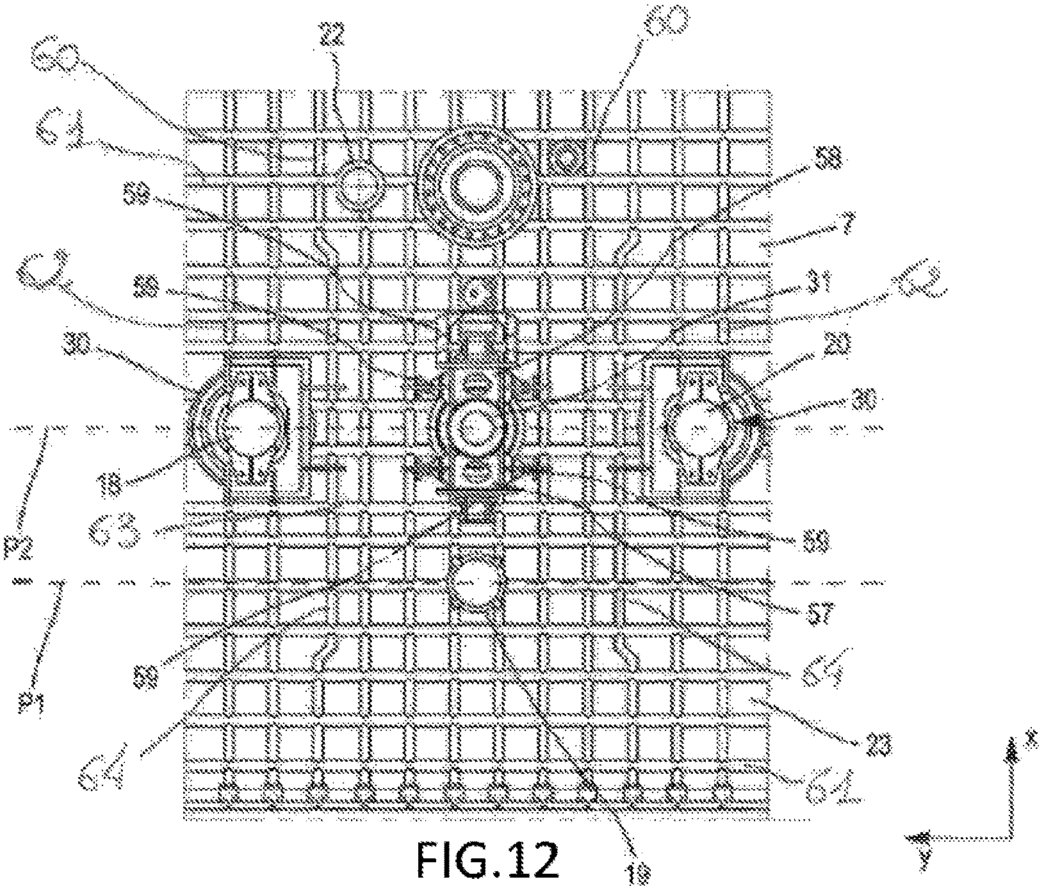
FIG. 12 is a top view of the bottom wall level with the loading/unloading tower according to a third embodiment.

FIG. 12 shows a third embodiment of the tank bottom wall, and in particular of the primary sealing membrane 7. This third embodiment is similar to the first embodiment, and differs from the first embodiment in the number of longitudinal corrugations 60 passing between the sump 30 and the support foot 31, and also in the distance between the sump 30 and the support foot 31, which in the third embodiment is only twice the corrugation pitch, for example close to thrice the corrugation pitch. In contrast to the second embodiment, the longitudinal corrugations 60 adjacent to interrupted longitudinal corrugations 62 are indeed diverted. However, owing to the distance, of close to thrice the corrugation pitch, between the sump 30 and the support foot 31, only three longitudinal corrugations 60 pass between the sump 30 and the support foot 31.

Figure 13:
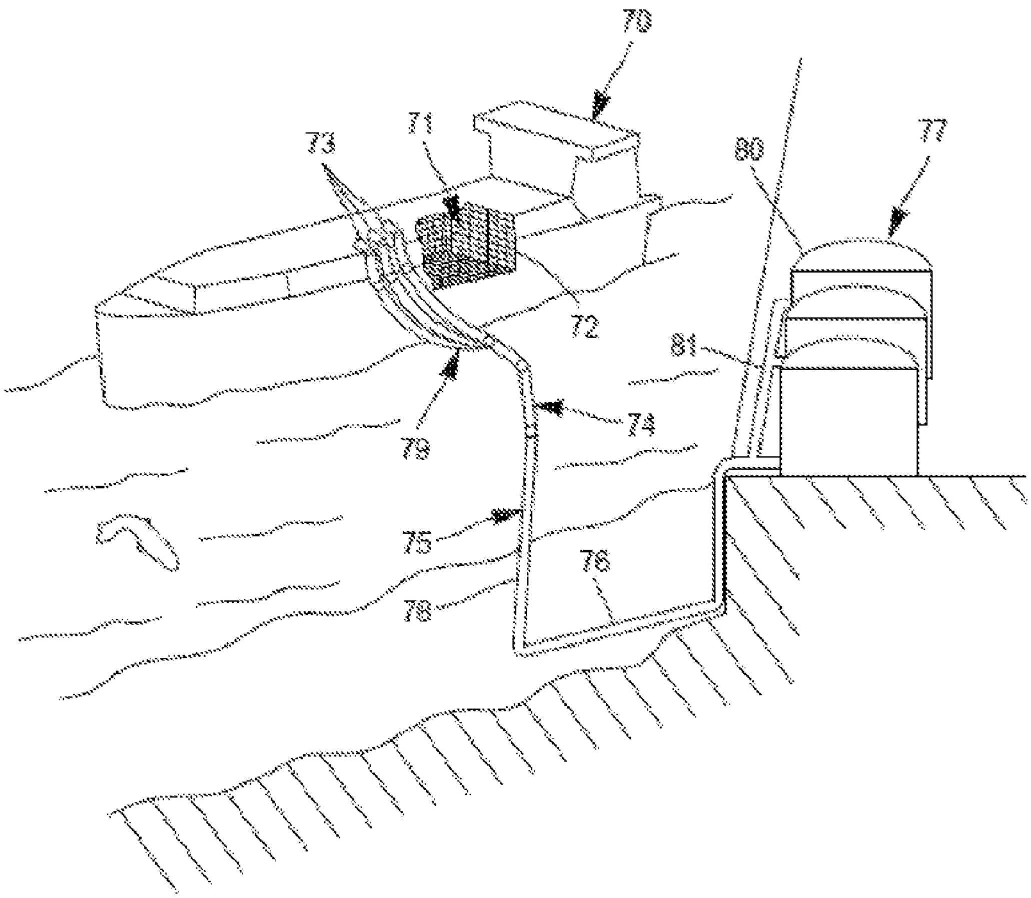
FIG. 13 is a cut-away schematic view of a liquefied natural gas carrier ship tank and of a loading/unloading terminal for this tank.

With reference to FIG. 13, a cut-away view of a ship 70 shows a sealed and insulated tank 71 having an overall prismatic shape mounted in the double hull 72 of the ship. The wall of the tank 71 has a primary sealing membrane designed to be in contact with the liquefied gas contained in the tank, a secondary sealing membrane arranged between the primary sealing membrane and the double hull 72 of the ship, and two insulating barriers arranged respectively between the primary sealing membrane and the secondary sealing membrane and between the secondary sealing membrane and the double hull 72.

In a known manner, the loading/unloading pipes 73 arranged on the upper deck of the ship can be connected, using appropriate connectors, to a sea or port terminal to transfer a cargo of LNG to or from the tank 71.

FIG. 13 shows an example sea terminal comprising a loading and/or unloading point 75, an undersea line 76 and an onshore facility 77. The loading and/or unloading point 75 is a static offshore installation comprising a moveable arm 74 and a tower 78 holding the moveable arm 74. The moveable arm 74 carries a bundle of insulated hoses 79 that can connect to the loading/unloading pipes 73. The orientable movable arm 74 can be adapted to all sizes of ships. A connecting line (not shown) extends inside the tower 78. The loading/unloading point 75 makes loading and unloading of the ship 70 possible to or from the onshore facility 77. This facility has liquefied gas storage tanks 80 and connection lines 81 connected via the undersea line 76 to the loading/unloading point 75. The undersea line 76 enables liquefied gas to be transferred between the loading/unloading point 75 and the onshore facility 77 over a large distance, for example 5 km, which makes it possible to keep the ship 70 a long way away from the coast during loading and unloading operations.

To create the pressure required to transfer the liquefied gas, pumps carried on board the ship 70 and/or pumps installed at the onshore facility 77 and/or pumps installed at the loading/unloading point 75 are used.

Although the invention has been described in relation to several specific embodiments, it is evidently in no way limited thereto and it includes all of the technical equivalents of the means described and the combinations thereof where these fall within the scope of the invention.

Use of the verb "comprise" or "include", including when conjugated, does not exclude the presence of other elements or other steps in addition to those mentioned in a claim.

In the claims, reference signs between parentheses should not be understood to constitute a limitation to the claim.

The invention claimed is:

1. A sealed and thermally insulating tank (1) for storing a fluid, the tank (1) being anchored in a load-bearing structure (3), the tank (1) having a loading/unloading tower (2) suspended from a ceiling wall (9) of the load-bearing structure (3), the tank (1) having a support foot (31) that is fastened to the load-bearing structure (3) in a zone of the bottom wall (23) of the tank (1), said support foot (31) being arranged to guide a vertical translational movement of the loading/unloading tower (2), the tank (1) having at least one sump (30) that is formed in the bottom wall (23) of the tank (1), the bottom wall of the tank comprising a corrugated sealing membrane (7) that is intended to be in contact with the fluid, the corrugated sealing membrane (7) comprising at least first corrugations (60) extending in a first direction (x) and spaced apart from one another, wherein the sump (30) and the support foot (31) are spaced apart by a distance such that at least three first corrugations (60) pass between the sump (30) and the support foot (31); and wherein the sealing membrane comprises second corrugations extending in a second direction (y) perpendicular to the first direction, the sump (30) and the support foot (31) being positioned between the directrices of two second corrugations.

2. The tank (1) as claimed in claim 1, wherein the sump (30) and the support foot (31) are spaced apart by a distance such that at least four first corrugations (60) pass between the sump (30) and the support foot (31).

3. The tank (1) as claimed in claim 1, wherein the sump (30) and the support foot (31) are positioned centrally between the directrices of two second corrugations.

4. The tank (1) as claimed in claim 1, wherein the sump (30) interrupts two first corrugations and two second corrugations.

5. The tank (1) as claimed in claim 1, wherein, in a zone of the bottom wall of the tank, remote from the support foot, the first corrugations are straight, parallel and equidistant, extending in the first direction, and the second corrugations are straight, parallel and equidistant, extending in the second direction, the distance between two adjacent first corrugations and the distance between two adjacent second corrugations being equal to the corrugation pitch.

6. The tank (1) as claimed in claim 1, wherein a first corrugation adjacent to one of the first corrugations interrupted by the sump (30) has a singular portion that is offset at a distance from the sump (30).

7. The tank (1) as claimed in claim 6, wherein the singular portion fits between the sump (30) and the support foot (31).

8. The tank (1) as claimed in claim 1, wherein the load-bearing structure (3) is integrated into a ship, the ship having a longitudinal direction (x) and the first corrugations are longitudinal corrugations extending in the longitudinal direction (x) of the ship.

9. The tank (1) as claimed in claim 1, the load-bearing structure (3) is integrated into a ship, the ship having a longitudinal direction (x) and a transverse direction (y) that is perpendicular to the longitudinal direction (x), and the second corrugations are transverse corrugations extending in the transverse direction (y) of the ship.

10. A sealed and thermally insulating tank (1) for storing a fluid, the tank (1) being anchored in a load-bearing structure (3), the tank (1) having a loading/unloading tower (2) suspended from a ceiling wall (9) of the load-bearing structure (3), the tank (1) having a support foot (31) that is fastened to the load-bearing structure (3) in a zone of the bottom wall (23) of the tank (1), said support foot (31) being arranged to guide a vertical translational movement of the loading/unloading tower (2), the tank (1) having at least one sump (30) that is formed in the bottom wall (23) of the tank (1), the bottom wall of the tank comprising a corrugated sealing membrane (7) that is intended to be in contact with the fluid, the corrugated sealing membrane (7) comprising at least first corrugations (60) extending in a first direction (x) and spaced apart from one another, wherein the sump (30) and the support foot (31) are spaced apart by a distance such that at least three first corrugations (60) pass between the sump (30) and the support foot (31);

wherein the loading/unloading tower (2) comprises a base (27) that extends horizontally and supports at least a first pump (18, 20), attached to the base (27), and fitted with a suction member, the suction member of the first pump (18) being accommodated in the sump (30), the first pump (18, 20) being aligned with the support foot (31) in a first transverse plane (P2) that is orthogonal to the first direction; and wherein the loading/unloading tower (2) comprising a first, a second and a third vertical pylons (11, 12, 13) defining a triangular-section prism, each pylon having a lower end, the base (27) being fastened to the lower end of the first, second and third pylons (11, 12, 13), the first pump (18, 20) being arranged outside the triangular prism and the support foot (31) extending the triangular-section prism.

11. The tank (1) as claimed in claim 10, wherein the first pylon and the second pylon (11, 12) are aligned in a second transverse plane (P1) which is orthogonal to the first direction.

12. The tank (1) as claimed in claim 10, wherein the loading/unloading tower (2) carries a second pump (18, 20) that is fastened to the base (27) and fitted with a suction member, the second pump (18, 20) being arranged outside the triangular prism and being aligned with the first pump (18, 20) and the support foot (31) in the first transverse plane (P2).

13. The tank (1) as claimed in claim 12, wherein the tank (1) has a second sump (30) that is formed in the bottom wall of the tank (1) and that houses the suction member of the second pump (20).

14. The tank (1) as claimed in claim 10, wherein the base (27) has at least one first lateral flange (45, 46) that projects in the second direction beyond the triangular-section prism and to which the first pump (18, 20) is fastened.

15. The tank (1) as claimed in claim 12, wherein the base (27) has a second lateral flange (45, 46) that projects in the second direction beyond the triangular-section prism and to which the second pump (18, 20) is fastened.

* * * * *